United States Patent
Meesala

(10) Patent No.: US 9,175,668 B2
(45) Date of Patent: Nov. 3, 2015

(54) HUB FOR WIND TURBINE ROTOR

(75) Inventor: Vidya Sagar Meesala, Rheine (DE)

(73) Assignee: General Electric Company, Schenectady, NY (US)

( * ) Notice: Subject to any disclaimer, the term of this patent is extended or adjusted under 35 U.S.C. 154(b) by 842 days.

(21) Appl. No.: 13/450,575

(22) Filed: Apr. 19, 2012

(65) Prior Publication Data

US 2013/0280089 A1    Oct. 24, 2013

(51) Int. Cl.
*F03D 1/06* (2006.01)
*F03D 11/04* (2006.01)

(52) U.S. Cl.
CPC ............. *F03D 1/0691* (2013.01); *Y02E 10/721* (2013.01)

(58) Field of Classification Search
CPC ..... Y02E 10/726; Y02E 10/72; Y02E 10/722; Y02E 10/721; F05B 2240/14; F04D 11/04; F04D 11/00; F03D 1/0691; F03D 1/065; F03D 1/06; F03D 11/04
USPC ......... 415/218.1, 201, 905, 908, 2.1, 4.1, 4.5; 416/244 R, 245 R, 155, 156, 157 R, 416/157 A, 157 B, 158; 290/44, 45
See application file for complete search history.

(56) References Cited

U.S. PATENT DOCUMENTS

| 4,274,807 | A * | 6/1981 | Kenney ........................... 416/48 |
| 7,244,102 | B2 * | 7/2007 | Delucis ......................... 416/156 |
| 2009/0167023 | A1 * | 7/2009 | Nies ............................... 290/55 |
| 2012/0063901 | A1 * | 3/2012 | Matsuda et al. .............. 416/156 |

FOREIGN PATENT DOCUMENTS

WO    WO 2011/134810 A1 * 11/2011

* cited by examiner

*Primary Examiner* — Dwayne J White
*Assistant Examiner* — Joshua R Beebe
(74) *Attorney, Agent, or Firm* — Dority & Manning, P.A.

(57) ABSTRACT

A hub for a rotor of a wind turbine is disclosed. The hub includes a hollow body rotatable around a rotation axis. The hollow body includes a blade flange and defines a blade flange area surrounded by the blade flange. The hollow body further includes a main shaft flange defining a first end, and a second end opposite the first end. The hub further includes a stiffening web extending within the blade flange area and defining a web plane. A side profile of the web plane extends from the first end to the second end is oriented at a cone angle to the rotation axis.

18 Claims, 5 Drawing Sheets

HUB FOR WIND TURBINE ROTOR

FIELD OF THE INVENTION

The present subject matter relates generally to hubs for rotors of wind turbines, and more particularly to hubs with improved stiffening features.

BACKGROUND OF THE INVENTION

Generally, a wind turbine includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy.

Advances in the wind turbine industry are resulting in increasingly larger wind turbines. Of particular concern due to these increasing sizes, however, is the weight of the wind turbine and components thereof. A particular concern is the weight of the rotor, which includes a hub and one or more rotor blades mounted to the hub. During operation of the wind turbine, the hub may be subjected to forces resulting from wind acting on the rotor blades and forces resulting from loads due to the rotation of the hub. The hub must be stiff enough so that these forces do not cause high deformations. In particular within the flanges for mounting the rotor blades to the hub, the hub must be designed rather stiff so that deformation or distortion, such as ovalization can be prevented, which in turn would affect the proper function and possibly damage the rotor blade bearings and pitch drives.

One example of an improved hub that improves or maintains the necessary stiffness while reducing weight is found in U.S. Pat. No. 7,244,102, directed to a reinforced hub. The hub includes a stiffening web extending within a blade flange area defined by a blade flange. The stiffening web can be oriented to extend within the flange area generally parallel to a rotation axis about which the hub rotates during operation, or at any suitable angle to the rotation axis. However, a side profile of the stiffening web of U.S. Pat. No. 7,244,102, or of a plane defined by the stiffening web that extends from a first end to a second end of the hub, is always parallel to the rotation axis. As such, a certain amount of material is required to connect the stiffening web to the flange and hub.

Accordingly, an improved hub for a rotor of a wind turbine is desired in the art. For example, a hub that includes stiffening features to maintain desired stiffness characteristics while reducing the material and associated weight required to connect the stiffening features to the flange and hub would be advantageous.

BRIEF DESCRIPTION OF THE INVENTION

Aspects and advantages of the invention will be set forth in part in the following description, or may be obvious from the description, or may be learned through practice of the invention.

In one embodiment, a hub for a rotor of a wind turbine is disclosed. The hub includes a hollow body rotatable around a rotation axis. The hollow body includes a blade flange and defines a blade flange area surrounded by the blade flange. The hollow body further includes a main shaft flange defining a first end, and a second end opposite the first end. The hub further includes a stiffening web extending within the blade flange area and defining a web plane. A side profile of the web plane extends from the first end to the second end is oriented at a cone angle to the rotation axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
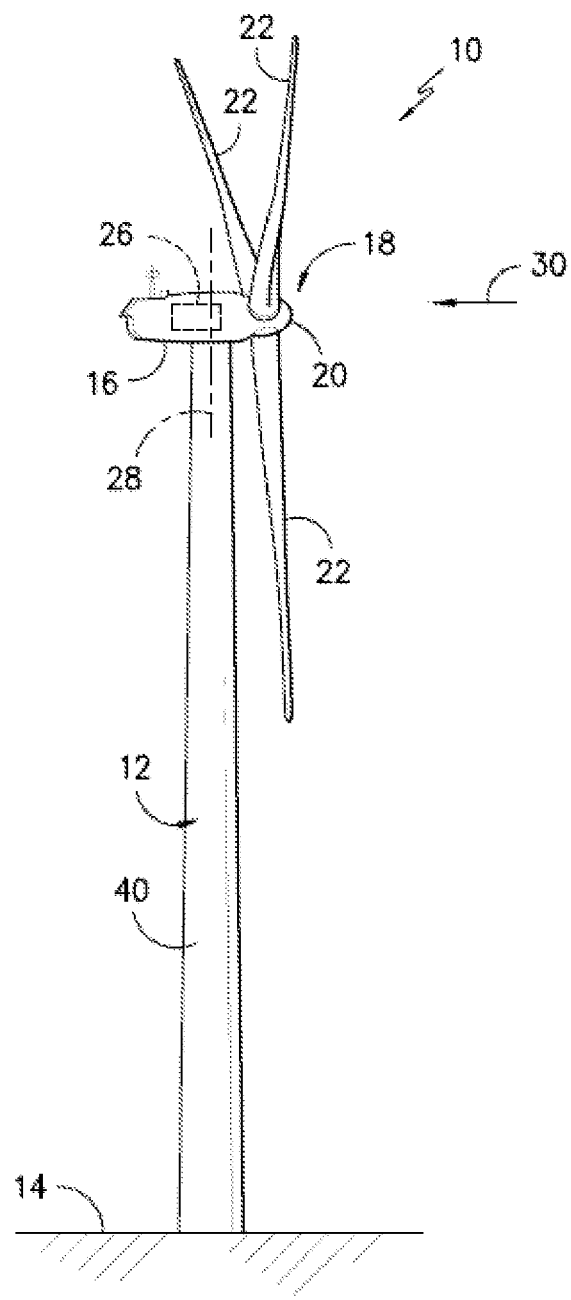
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to the drawings, FIG. 1 illustrates perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

As shown, the wind turbine 10 may also include a turbine control system or turbine controller 26 centralized within the nacelle 16. However, it should be appreciated that the turbine controller 26 may be disposed at any location on or in the wind turbine 10, at any location on the support surface 14 or generally at any other location. The turbine controller 26 may generally comprise as any suitable processing unit configured to perform the functions described herein. Thus, in several embodiments, the turbine controller 26 may include suitable computer-readable instructions that, when implemented, configure the controller 26 perform various different actions, such as transmitting and executing wind turbine control signals, receiving and analyzing sensor signals and generating message signals to provide an indication of the wear occurring on any brake pads of the wind turbine 10.

By transmitting and executing wind turbine control signals, the turbine controller 26 may generally be configured to control the various operating modes (e.g., start-up or shut-down sequences) and/or components of the wind turbine 10. For example, the controller 26 may be configured to control the yaw direction of the nacelle 16 about a yaw axis 28 to position the rotor blades 22 with respect to the direction 30 of the wind, thereby controlling the load and power output generated by the wind turbine 10. For example, as will be described below, the turbine controller 26 may be configured to transmit control signals/commands to one or more yaw drive mechanisms (not shown) of the wind turbine 10 such that the nacelle 16 may be rotated about the yaw axis 28.

Exemplary embodiments of a hub 20 for a rotor 18 of a wind turbine 10 are shown in FIGS. 2 through 7. A hub 20 includes a hollow body 50. The hollow body 50 is formed from any suitable material, and in exemplary embodiments may be formed from a suitable cast material. The hollow body 50 is rotatable around a rotation axis 52, which may extend generally centrally through the hollow body 50. The hollow body 50 may include and define a first end 54 and a second end 56 opposite the first end 54, through which the rotation axis 52 may extend.

A main shaft flange 60 may be included in the hollow body 50, as shown. The main shaft flange 60 may define the first end 54. For example, the first end 54 may be defined generally centrally of the main shaft flange 60. The main shaft flange 60 may define and surround a main shaft flange area 62. The main shaft flange area 62 may generally be a hole defined in the hollow body 50 within the main shaft flange 60. A main shaft (not shown) of the wind turbine may be mounted to the hub at the main shaft flange 60.

A man hole flange 64 may additionally be included in the hollow body 50, as shown. The man hole flange 64 may defined the second end 56. For example, the second end 56 may be defined generally centrally of the man hole flange 64. The man hole flange 64 may define and surround a man hole flange area 66. The man hole flange area 66 may generally be a hole defined in the hollow body 50 within the man hole flange 64.

The hollow body 50 of a hub 20 according to the present disclosure may further include one or more blade flanges 70. The blade flanges 70 may be positioned on the hollow body 50 between the first end 54 and the second end 56, and may be arrayed about the rotation axis 52. For example, one, two, three, four, or more blade flanges 70 may be included in a hollow body 50. The blade flanges 70 may be spaced apart equally in an array about the rotational axis 52. Thus, for example, three blade flanges 70 may each be spaced apart from one another by 120 degrees. Each blade flange 70 may define and surround a blade flange area 72. The blade flange area 72 may generally be a hole defined in the hollow body within the blade flange 70.

As shown, a hub 20 according to the present disclosure further includes one or more stiffening webs 80. One or more stiffening webs 80 may be provided within a blade flange area 72 of one or more of the blade flanges 70. Each stiffening web 80 may extend within a blade flange area 72. A stiffening web 80 may include, for example, an inner face 82 facing into the hub 20 and an outer face 84 facing away from the hub 20. A peripheral edge 86 may extend between the inner face 82 and outer face 84.

A stiffening web 80 may further define a web plane 88. The web plane 88 may be a plane defined by the stiffening web 80 as it extends within the blade flange area 72. For example, in exemplary embodiments, the inner face 82 or the outer face 84 defines the web plane 88. It should be understood that a web plane 88 may be defined for any suitable embodiment of a stiffening web 80, including embodiments wherein the inner and outer surfaces of the stiffening web 80 may not be planer faces. For example, in embodiments wherein the inner and outer surfaces are curved, the web plane 88 may be tangent to the curve or otherwise defined to generally extend across and within the blade flange area 72 as shown.

A stiffening web 80 according to the present disclosure in exemplary embodiments includes a plurality of web portions 90. Each web portion 90 may generally extend from the blade flange 70 into the blade flange area 72. Further, in exemplary embodiments as shown, each web portion 90 may extend to a center point 92 of the flange area 72. The web portions 90 may connect at the center point 92, or at another suitable point within the flange area 72, to form the stiffening web 80.

Figure 2:
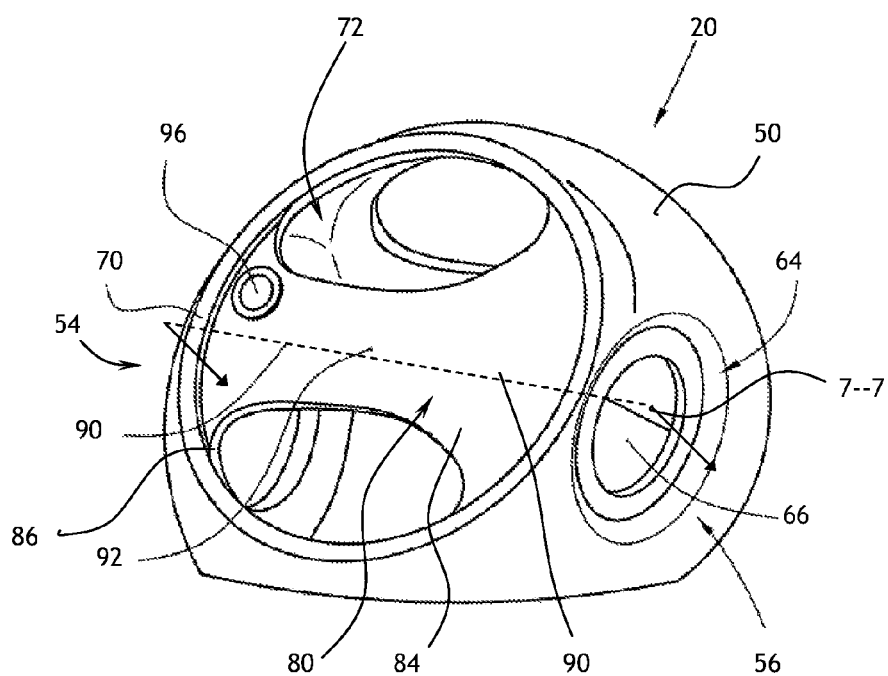
FIG. 2 illustrates a perspective view of a hub according to one embodiment of the present disclosure.
Figure 3:
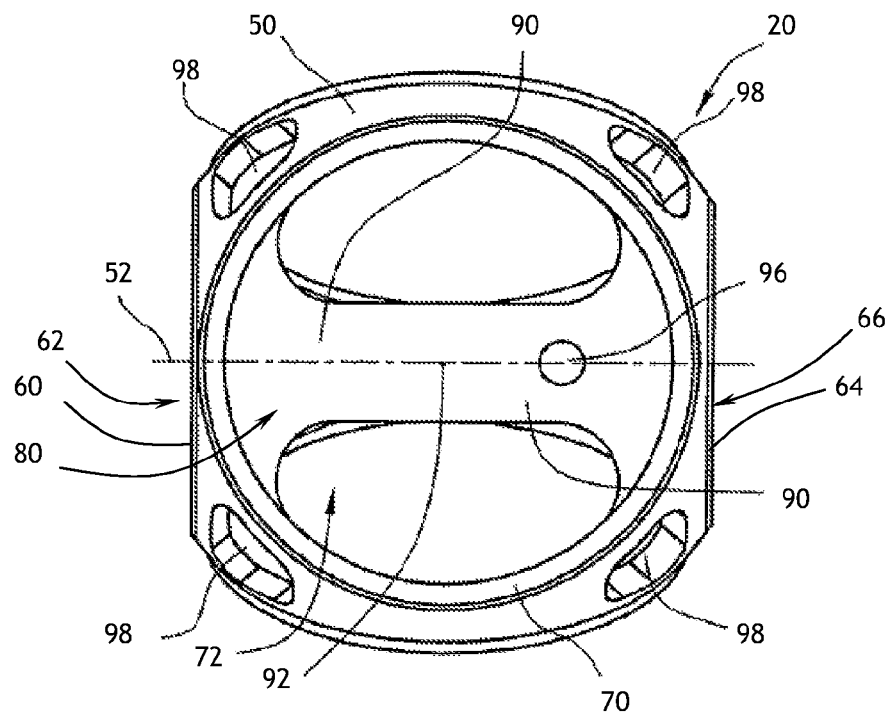
FIG. 3 illustrates a perspective view of a hub according to another embodiment of the present disclosure.
Figure 4:
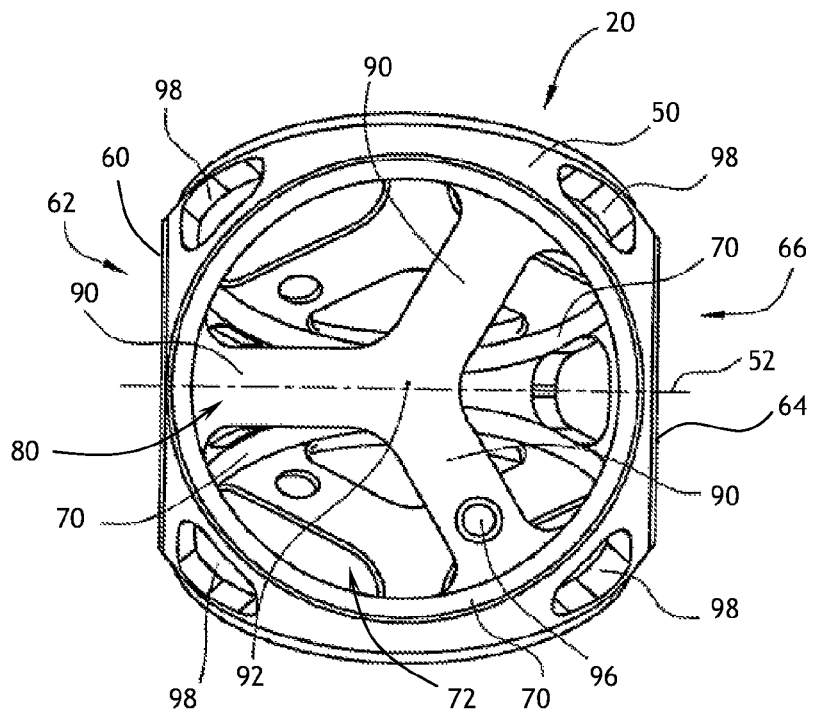
FIG. 4 illustrates a perspective view of a hub according to another embodiment of the present disclosure.
Figure 5:
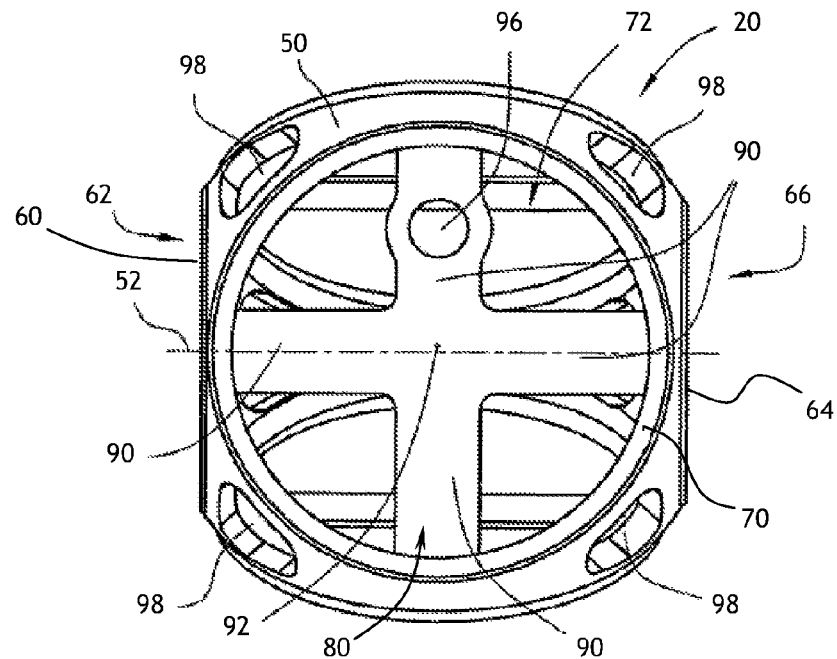
FIG. 5 illustrates a perspective view of a hub according to another embodiment of the present disclosure.
Figure 6:
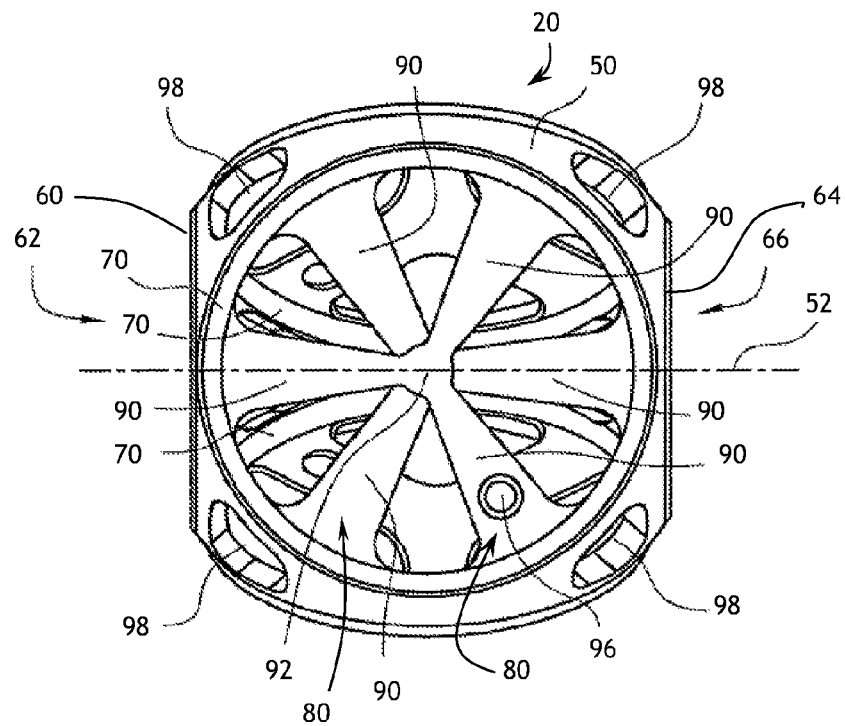
FIG. 6 illustrates a perspective view of a hub according to another embodiment of the present disclosure; and, FIG. 7 illustrates a cross-sectional view, along the lines 7-7 of FIG. 2, of a hub according to another embodiment of the present disclosure.

For example, FIGS. 2 and 3 illustrate stiffening webs 80 that each include two web portions 90. FIGS. 4 and 6 illustrate stiffening webs 80 that each include three web portions 90. FIG. 5 illustrates a stiffening web 80 that includes four web portions 90. It should be understood that the present disclosure is not limited to stiffening webs 80 having any specified number of web portions 90, and rather that any suitable stiffening web 80 having any suitable number of web portions 90 is within the scope and spirit of the present disclosure.

A stiffening web 80 according to the present disclosure may further have any suitable orientation extending within the blade flange area 72 with respect to the rotation axis 52. In some embodiments, for example, a stiffening web 80 or portion thereof may be oriented to extend within the blade flange area 72 generally parallel to the rotation axis 52. For example, FIGS. 2 and 3 illustrate a stiffening web 80 having such a parallel orientation. In these embodiments each web portion 90 is oriented to extend from the blade flange 70 into the blade flange area 72, such as to the center point 92, generally parallel to the rotation axis 52. In other embodiments, the stiffening web 80 or any portion thereof may be oriented to extend within the blade flange area 72 at any suitable angle to rotation axis 52. For example, FIGS. 4 and 6 illustrate embodiments wherein one web portion 90 of a stiffening web 80 is oriented to extend parallel to the rotation axis 52, and wherein other web portions 90 are oriented to extend at angles to the rotation axis 52. The web portions 90 as shown are oriented at approximately 60 degrees from the rotation axis 52, such that the three web portions 90 of the stiffening web 80 are equally spaced apart. However, it should be understood that the web portions 90 may be oriented at any suitable angle. FIG. 5 illustrates another embodiment, wherein two web portions 90 of a stiffening web 80 are oriented to extend parallel to the rotation axis 52, and wherein two other web portions 90 are oriented to extend at angles to the rotation axis 52. The web portions 90 as shown are oriented at approximately 90 degrees from, or perpendicular to, the rotation axis 52, such that the four web portions 90 of the stiffening web 80 are equally spaced apart.

The web portions 90 forming a stiffening web 80 may be separate components, or in exemplary embodiments may be integral, thus forming a singular stiffening web 80, as shown. Further, each stiffening web 80 in general may be a separate component from the hollow body 50, or may be integral with the hollow body 50, thus forming a singular component that includes the hollow body 50 and stiffening webs 80, as shown. In exemplary embodiments, for example, the stiffening webs 80 may be integrally cast with the hollow body 50 to form such a singular component.

In some embodiments, as shown, one or more stiffening webs 80 may include a pitch drive aperture 96 defined therein. A pitch drive aperture 96 may be a hole defined in the stiffening web 80, such as within a suitable web portion 90 thereof. A shaft and/or other suitable portion of a pitch drive (not shown) for a rotor blade 22 may extend through the pitch drive aperture 96, and may be coupled to a bearing (not shown) which is in turn coupled to the rotor blade 22 to rotate the rotor blade 22 about a pitch axis (not shown).

As shown in FIGS. 3 through 6, a hollow body 50 according to the present disclosure may further include additional apertures 98 defined therein. These apertures 98 may be defined in the hollow body 50, for example, between the various blade flanges 70. The apertures 98 may be defined in the hollow body 50 to serve as man holes, and may additionally reduce the overall weight of the hub 20 and the materials utilized to manufacture the hub 20.

Figure 7:
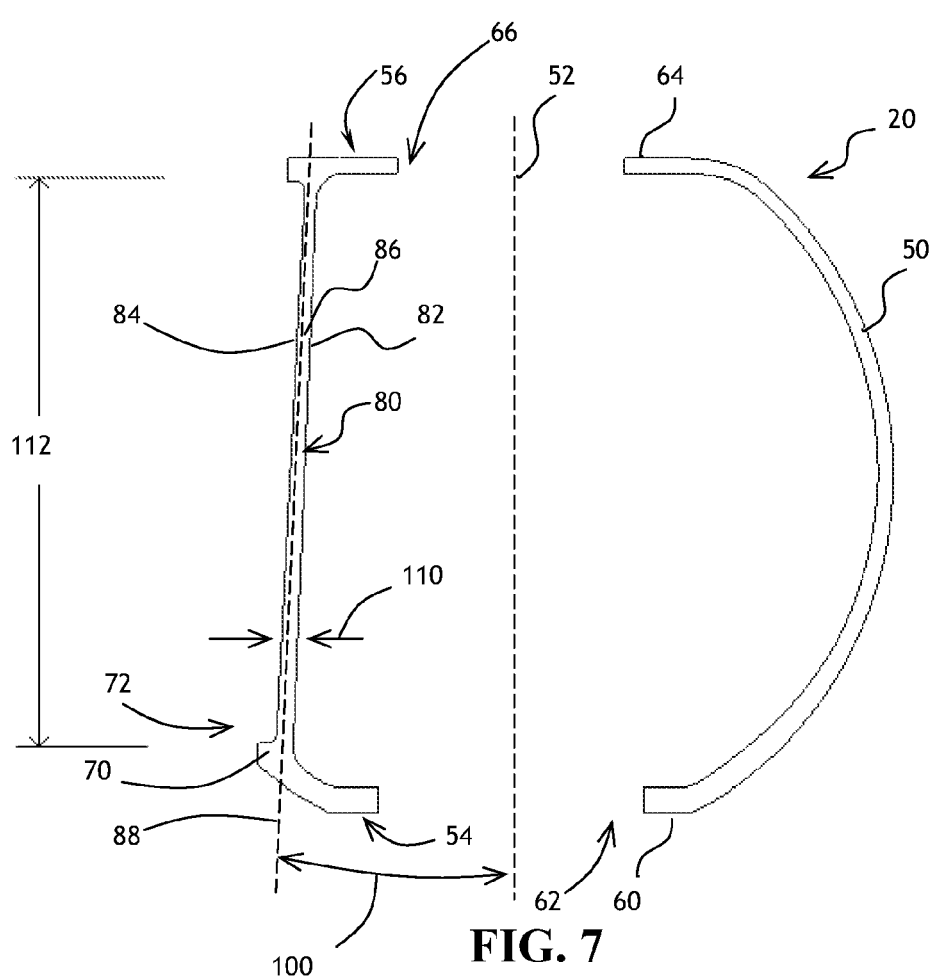

Stiffening webs 80 according to the present disclosure are further advantageously designed to reduce the weight of the hub 20 and the materials utilized to manufacture the hub 20. To provide such advantageous weight and material reduction, a side profile of one or more web planes 88 of the stiffening webs 80 is angled to the rotation axis 52. A side profile of web plane 88 and stiffening web 80 is a cross-sectional profile taken as shown in FIG. 7. As shown, a side profile of a web plane 88 and stiffening web 80 extending from the first end 54 to the second end 56 of the hollow body 50 is oriented at an angle to the rotation axis 52. Further, in exemplary embodiments, the angle is a cone angle 100. The cone angle 100 is an angle at which one or more of the flanges 70 is tilted, in order to tilt the associated rotor blades 22 with respect to the tower 12.

In some embodiments, the cone angle 100 is between approximately 0.5 degrees and approximately 10 degrees. In other embodiments, the cone angle 100 is between approximately 1 degree and approximately 10 degrees. In still other embodiments, the cone angle 100 is between approximately 0.5 degrees and approximately 5 degrees. In still other embodiments, the cone angle 100 is between approximately 1 degree and approximately 5 degrees. It should be understood, however, that the present disclosure is not limited to a cone angle 100 in the ranges as specified, and rather that any suitable range, subrange, or cone angle is within the scope and spirit of the present disclosure. Further, it should be understood that the present disclosure is not limited to cone angles, and rather that any suitable range, subrange, or angle is within the scope and spirit of the present disclosure.

The inventors of the present disclosure have found that angling the side profile of the web plane 88 and stiffening web 80 may be particularly advantageous in reducing the materials and associated weights required for manufacturing a hub 20 with a suitable stiffness. For example, the materials utilized at the ends of the stiffening webs 80 that are coupled to the blade flanges 70 can be considerably reduced, as compared to stiffening webs 80 with web plane 88 side profiles that are parallel to the rotation axis 52. For example, in one non-limiting example, the inventors have estimated that angling of the side profile of the stiffening webs 80 to a cone angle 100 for a hub 20 of a three megawatt or greater wind turbine 10 results in a material savings that provides an approximate four ton or greater weight reduction and an approximate $6000 or greater savings. The inventors have further estimated that such angling may, in another non-limiting example, result in an estimated savings of approximately $1.50 to approximately $2.00 per kilogram of weight reduced. Hubs 20 according to the present disclosure are thus particularly advantageous at providing desired material, weight, and cost reductions while still maintaining the stiffness required for use in a wind turbine 10.

A stiffening web 80 according to the present disclosure further has a thickness 110 and a length 112, as defined with respect to a side profile of the stiffening web 80 as shown in FIG. 7. In some embodiments, the thickness 110 may be constant throughout the length 112. In other embodiments, the thickness 110 may taper through the length 112 or a portion thereof. For example, in some embodiments as shown in FIG. 7, the thickness 110 may taper throughout the length 112 from the first end 54 of the hollow body 50 to the second end 56 of the hollow body 50. Such tapering may in some embodiments advantageously facilitate inexpensive and time efficient manufacturing of the hub 20, such as in embodiments wherein the hub 20 is integrally case. In other embodiment, the thickness 110 may taper throughout the length 112 from the second end 56 to the first end 54, or throughout any suitable portion of the length 112 in any suitable direction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hub for a rotor of a wind turbine, the hub comprising:
a hollow body rotatable around a rotation axis, the hollow body comprising a blade flange and defining a blade flange area surrounded by the blade flange, the hollow body further comprising a main shaft flange defining a first end, and a second end opposite the first end; and
a stiffening web extending within the blade flange area and defining a web plane,
wherein a side profile of the web plane extending from the first end to the second end is oriented at a cone angle to the rotation axis, and wherein a thickness of the stiffening web tapers throughout at least a portion of a length of the stiffening web from the first end to the second end.

2. The hub of claim 1, wherein the cone angle is between approximately 0.5 degrees and approximately 10 degrees.

3. The hub of claim 1, wherein the cone angle is between approximately 1 degree and approximately 5 degrees.

4. The hub of claim 1, wherein the stiffening web comprises two web portions each extending from the flange to a center point of the blade flange area.

5. The hub of claim 1, wherein the stiffening web comprises three web portions each extending from the flange to a center point of the blade flange area.

6. The hub of claim 1, wherein the stiffening web is integrally formed with the hollow body.

7. The hub of claim 1, wherein the hollow body further comprises a man hole flange defining the second end.

8. The hub of claim 1, further comprising a pitch drive aperture defined in the stiffening web.

9. The hub of claim 1, wherein a plurality of stiffening webs extend within the blade flange area and each define a web plane.

10. The hub of claim 1, wherein the hollow body comprises a plurality of blade flanges each defining a blade flange area, and wherein a stiffening web extends within each of the plurality of blade flanges.

11. The hub of claim 1, wherein the stiffening web is further oriented to extend within the blade flange area generally along the rotation axis.

12. A wind turbine, comprising:
    a tower;
    a nacelle mounted on the tower;
    a rotor coupled to the nacelle, the rotor comprising a hub and a rotor blade, the hub comprising:
    a hollow body rotatable around a rotation axis, the hollow body comprising a blade flange and defining a blade flange area surrounded by the blade flange, the hollow body further comprising a main shaft flange defining a first end, and a second end opposite the first end; and
    a stiffening web extending within the blade flange area and defining a web plane,
    wherein a side profile of the web plane extending from the first end to the second end is oriented at a cone angle to the rotation axis, and wherein a thickness of the stiffening web tapers throughout at least a portion of a length of the stiffening web from the first end to the second end.

13. The wind turbine of claim 12, wherein the cone angle is between approximately 0.5 degrees and approximately 10 degrees.

14. The wind turbine of claim 12, wherein the stiffening web comprises two web portions each extending from the flange to a center point of the blade flange area.

15. The wind turbine of claim 12, wherein the stiffening web is integrally formed with the hollow body.

16. The wind turbine of claim 12, wherein the hollow body further comprises a man hole flange defining the second end.

17. The wind turbine of claim 12, further comprising a pitch drive aperture defined in the stiffening web.

18. The wind turbine of claim 12, wherein the stiffening web is further oriented to extend within the blade flange area generally along the rotation axis.

* * * * *